United States Patent

[11] 3,536,128

| [72] | Inventor | Rene Georges Bachelier<br>Paris, France |
|---|---|---|
| [21] | Appl. No. | 700,162 |
| [22] | Filed | Jan. 24, 1968 |
| [45] | Patented | Oct. 27, 1970 |
| [73] | Assignee | Ateliers de Constructions Mecaniques et de Chaudronnerie Corpet Louvet & Cie<br>a French corporation |
| [32] | Priority | Feb. 3, 1967 |
| [33] | | France |
| [31] | | 93,556 |

[54] INJECTION ASSEMBLY FOR A PRESSURE MOULDING MAHCINE
3 Claims, 7 Drawing Figs.

[52] U.S. Cl. .................................................. 164/314,
18/30
[51] Int. Cl. .................................................. B22d 17/04
[50] Field of Search .................................... 164/120,
152, 153, 312, 314, 315; 18/12(P)

[56] References Cited
UNITED STATES PATENTS

| 2,505,540 | 4/1950 | Goldhard | 164/312X |
|---|---|---|---|
| 2,649,693 | 8/1953 | Venus | 164/315X |
| 2,839,800 | 6/1958 | Hodler | 164/314 |
| 3,085,302 | 4/1963 | Federman | 164/312X |
| 3,344,848 | 10/1967 | Hall et al. | 164/312 |

Primary Examiner—J. Spencer Overholser
Assistant Examiner—Michael O. Sutton
Attorney—Young & Thompson ABSTRACT: An injection assembly for a pressure moulding machine, the assembly having an injection piston movable in a chamber connected to the mould and coupled to a double acting hydraulic control jack, movement of which is transmitted to the injection piston by means of a fluid filled damping chamber of variable volume. The damping chamber has an orifice adapted to be opened when an overload is imposed on the injection piston.

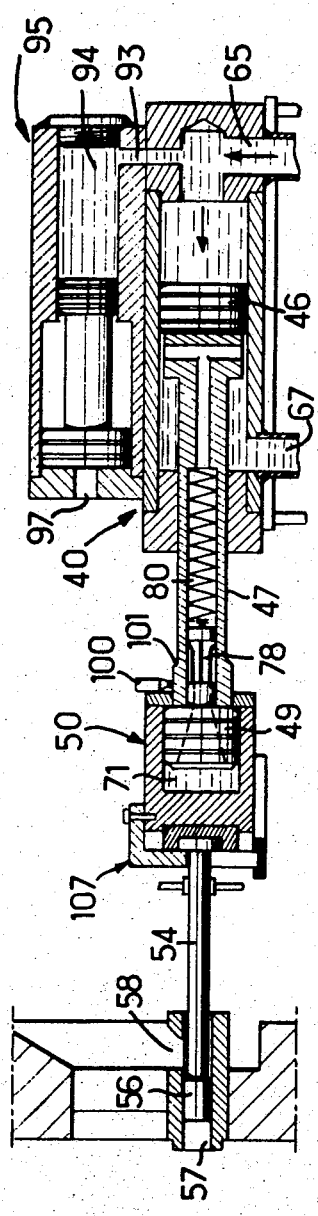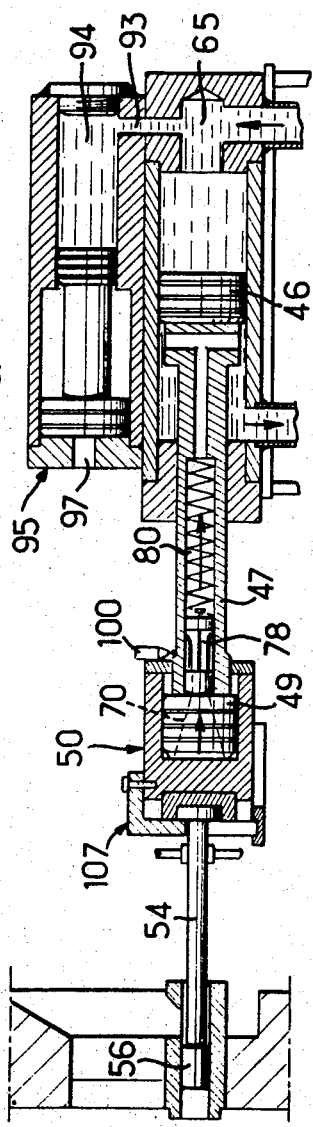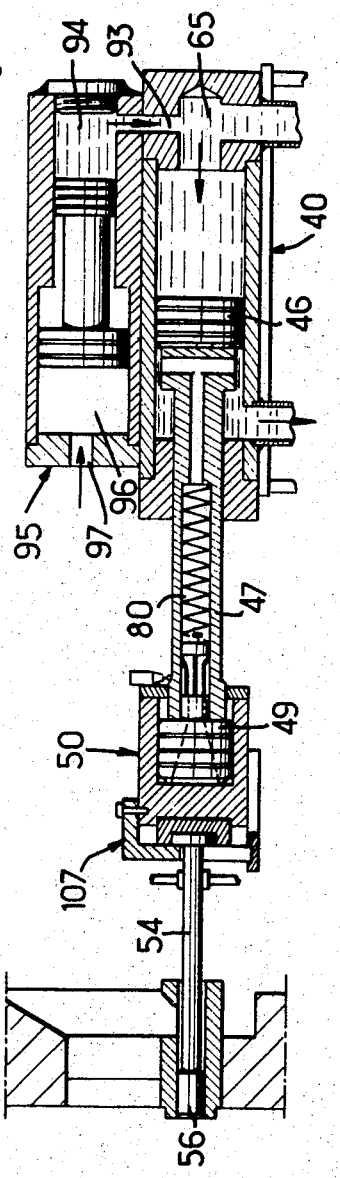

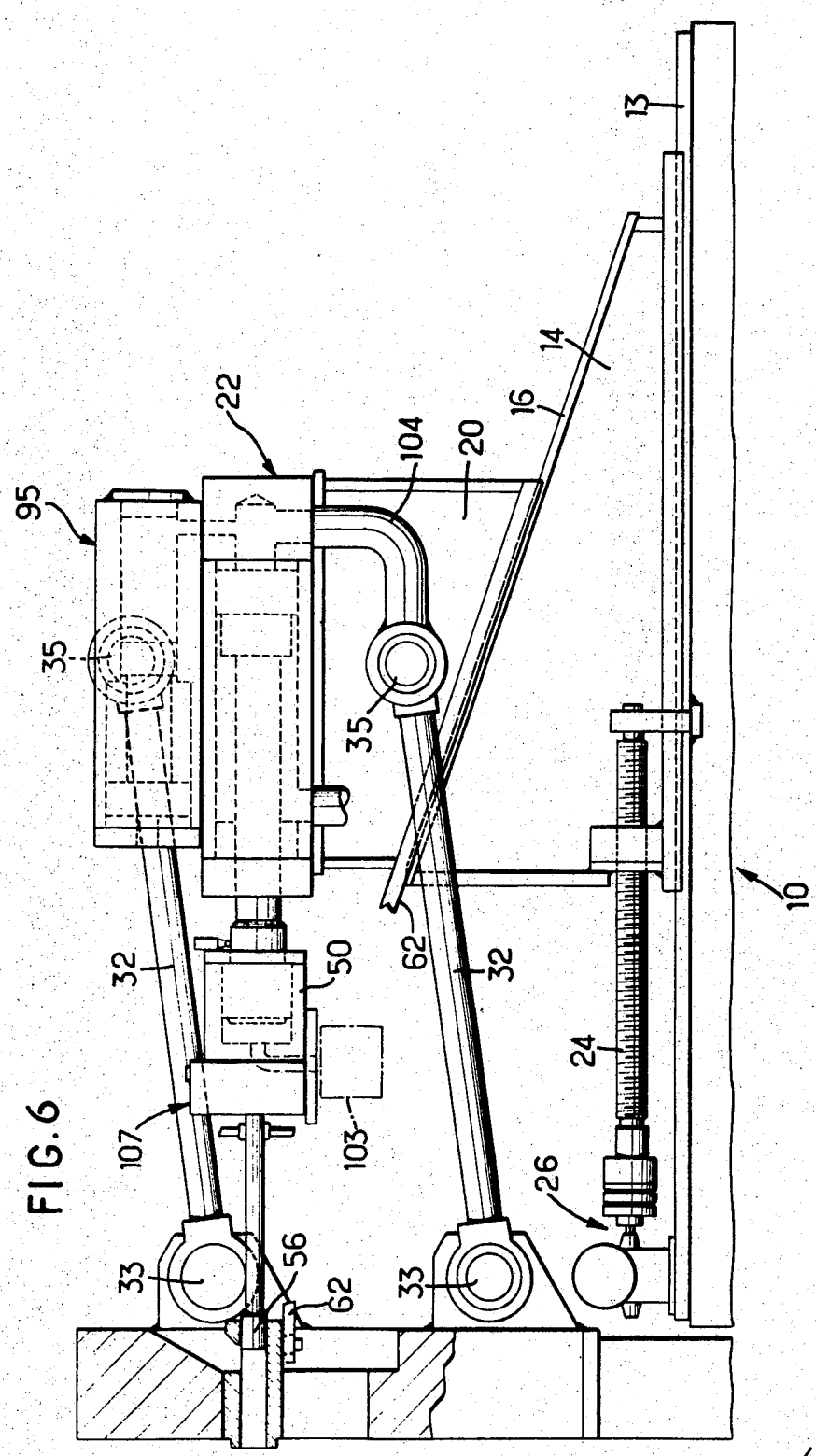

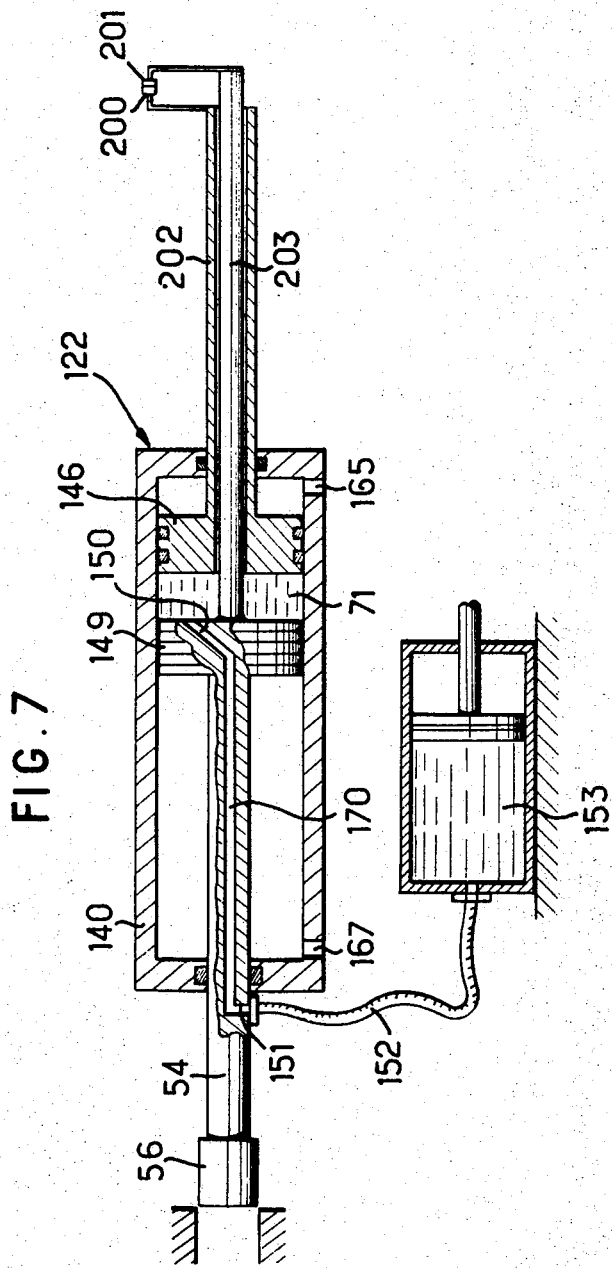

INJECTION ASSEMBLY FOR A PRESSURE MOULDING MAHCINE

The present invention relates to an injection assembly for a pressure moulding machine, particularly for the injection of metal.

An assembly of this kind usually comprises an injection piston actuated by a hydraulic jack which forces the metal in the molten state into a mould. It must ensure the complete filling of the mould and, in order to avoid a premature cooling of the metal, it must be capable of very rapid movement. When the mould is full the piston must exert a very high pressure to compensate for contraction of the metal during solidification and ensure the compression of the metal, but during this operation the piston collides with a practically solid mass and is stopped very suddenly. The result of such a stop is to cause hammering in the hydraulic jack which, because of the resulting considerable rise in pressure, creates an overload on the closure portion of the mould and can cause the mould to open. Such an overload can, moreover, give rise to serious accidents.

The injection assembly of the present invention enables hammering to be avoided in the jack and in the hydraulic circuit associated therewith.

The injection assembly of the invention is moreover designed to provide greater flexibility of use and to enable moulds of various origins to be employed.

This is usually not possible in known machines which are provided to inject in two or three positions and which, due to lack of standardization between machines of different constructions, cannot take moulds which are not specially designed for them.

According to the present invention, the injection assembly for a pressure moulding machine for metals includes an injection piston which is movable in a chamber connected to the mould and having an injection orifice, the injection piston being coupled to the piston of a double-acting hydraulic control jack, and is characterized in that the coupling of the two pistons is effected by means of a damping chamber of variable volume completely filled with an incompressible fluid and having an exhaust orifice adapted to open when the pressure of the fluid in the chamber exceeds a predetermined level.

By virtue of this arrangement, when the injection piston, driven by the control piston, encounters a resistance such that the pressure created in the damping chamber exceeds said predetermined level, which happens when the mould is full, the exhaust orifice opens to permit outflow of fluid, the injection piston remaining stationary until the chamber is completely empty, at which point the injection piston begins to move again.

Thus, when the injection piston is suddenly stopped, the mould being full, the resulting sudden pressure increase causes exhaustion of fluid from the damping chamber and is not transmitted to the injection piston. The serious accidents which sometimes occur in injection assemblies due to rupture of the fluid ducts, which is extremely dangerous because of the proximity of combustion centres, are thereby avoided.

In order that the invention may be more fully understood, some embodiments in accordance therewith will now be described, by way of example, with reference to the accompanying drawings in which:

FIGS. 3 to 5 are similar views to FIG. 1 showing respectively the beginning of the injection, the beginning of compression and the completion of filling of the mould;

FIG. 6 is a similar view to that of FIG. 1 in which the injection chamber occupies a high position; and FIG. 7 is a schematic sectional view of another embodiment of the assembly of the invention.

Figure 1:
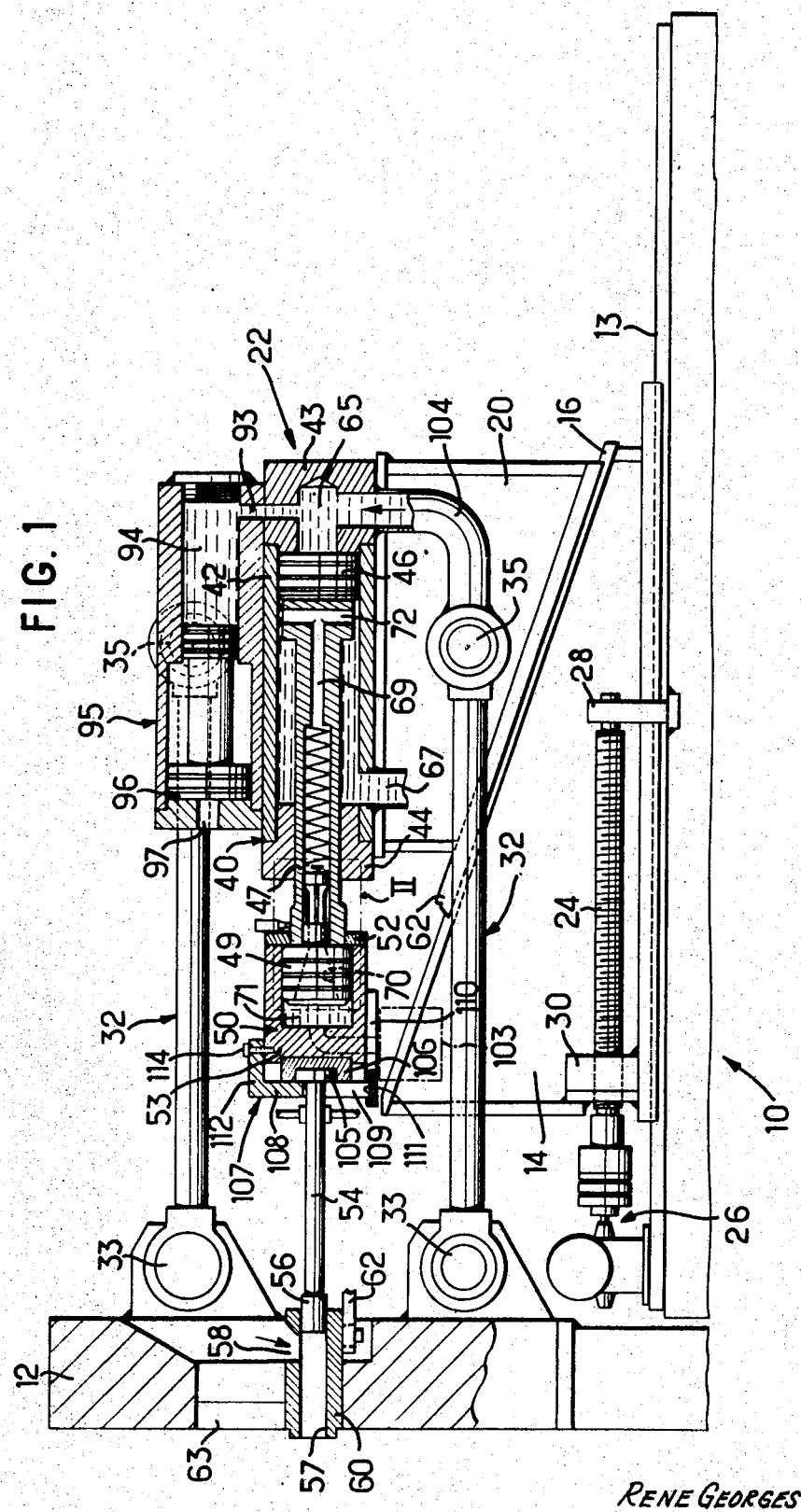
FIG. 1 is a schematic sectional view of one embodiment of the injection assembly of the invention, the injection piston being in a rest position before injection and the injection chamber occupying a low position.
Figure 2:
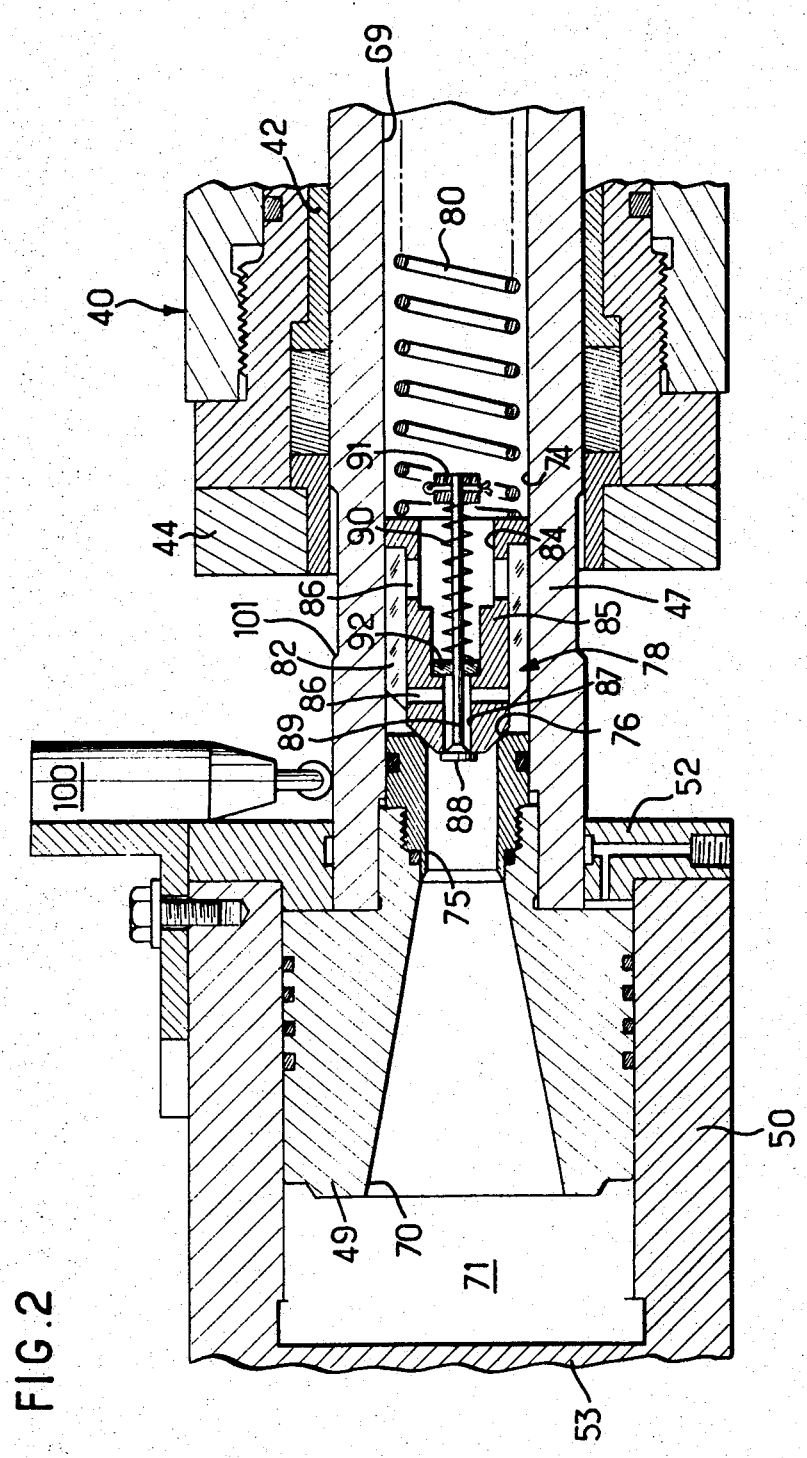
FIG. 2 is a view to a larger scale of the area of FIG. 1 within the rectangle II.

In the embodiment described and shown, the injection assembly of the invention is mounted on a rigid frame 10.

A mould-carrying plate 12 is rigidly fixed to the frame, which latter has horizontal slideways 13 on which is slidably mounted a bed 14. The upper portion of this bed is provided with slideways 16 inclined with respect to the horizontal, upwardly towards the plate 12 in this embodiment, on which slideways is mounted a support 20 for a horizontally disposed hydraulic jack 22, described in greater detail hereafter.

The bed 14 constitutes a carriage and is associated with a screw 24 parallel to the slides 13 and having one end coupled to the output shaft of a reduction drive gear 26, the other end of the screw being carried in a bearing 28 fixed to the frame. The screw 24 is engaged with a screw thread in a lug 30 of the bed 14 forming a nut. Thus, rotation of the screw 24 produces translational movement of the lug 30 along the said screw and thus of the bed along the slideways 13.

Locking elements (not shown), enable the bed 14 to be locked at will on the slides 13, and other similar elements (also not shown) enable the support 20 to be locked on the slideways 16.

The support 20 is connected to the plate 12 by an assembly of parallel rods 32 of equal length each having one end pivoted on the plate 12 about a horizontal axis 33 perpendicular to the slideways 13, the other end of each rod being pivoted to the support 20 about an axis 35 parallel to the axis 33.

Thus, rotation of the screw 24 to cause movement of the bed 14 away from the plate 12, causes a rising movement of the support 20 held by the rods 32. Rotation in the opposite direction causes the support to be lowered.

Movement of the bed 14 can naturally be effected by any other means such as a pneumatic or hydraulic jack for example.

The jack 22 has a body 40 fixed to the support 20 and including a cylinder 42 whose ends are closed respectively by a bottom 43 at the end remote from the plate 12 and by a cap 44 at the end nearest to said plate.

A piston 46 is housed in the cylinder 42, which piston is rigid with an axial extension 47 extending towards the plate 12 and passing through the cap 44 where it is sealed by a fluid-tight element. At its end remote from the piston 46, the extension 47 is fixed to a piston 49 movable in a cylinder 50, and passes in fluid-tight manner through a rear plate 52 of the cylinder 50. The other plate 53 of this cylinder is connected by means of a rod 54 to an injection piston 56 movable in a chamber 57 which has an injection orifice 58 and is connected to the mould (not shown).

This chamber 57 is formed in a block 60 which is supported by arms 62 extending from the support 20 and which is mounted, for vertical sliding movement, in an aperture 63 in the mould carrying plate.

The rear end of the cylinder 42 is connected by a passage 65 passing through the end portion 43 to a source of fluid under pressure (not shown), while a passage 67 connects the other end of this cylinder to the said source.

The extension 47 connecting the pistons 46 and 49 is hollow and has an axial passage 69 which leads to the front face of the piston 49 through a widened portion 70 and thus communicates with a damping chamber 71 of the cylinder 50 located in front of the piston 49, while the axial passage 69 is interrupted slightly before the piston 46 and communicates with the interior chamber of the cylinder 42, before the piston 46, by a radial conduit 72.

Behind the piston 49 the passage 69 has a portion 74 of enlarged section and receives, at the junction of the widened portion 70 and the said passage, a sleeve 75 of internal diameter less than that of the portion 74, the rear face of this sleeve forming a seat 76 for a valve 78 slidably movable in the portion 74 and urged towards the seat 76 by a calibrated spring 80.

This valve 78 has fins 82 formed on its periphery and a cavity 84 is cut in its rear portion to form a skirt 85 in the wall of which are formed radial openings 86 between the fins 82 and connecting the passage 69 to the space surrounding the valve 78.

At the bottom of the cavity 84 is formed an axial bore 87 making a direct communication between the space located in front of the valve 78 and that situated behind this valve, a radial conduit 86 connecting the bore to the annular space surrounding the valve. This bore forms, on the forward face of the valve, a seat for a valve 88 having a stem 89 which passes through the said bore leaving a large radial clearance. A spring 90 surrounds this stem and bears between an abutment 91 mounted on the end of the stem and a washer 92 surrounding the stem and housed at the bottom of the cavity 84, this spring urging the valve 88 against its seat on the front face of the valve 78.

The passage 65 of the jack 22 is preferably connected by a conduit 93 to the high pressure chamber 94 of a pressure step-up device 95 of known type of which the low pressure chamber 96 is connected by a conduit 97 to the hydraulic fluid source. This step-up device 95 comprises a piston having faces of unequal section, the face of largest section bounding the low pressure chamber.

The different phases of operation of the assembly are illustrated in the accompanying drawings.

Before injection takes place, the piston 46 of the jack 22 is pushed to the end of its cylinder by introduction of fluid through the passage 67, the chamber 71 forward of the piston 49 being full of fluid. The injection piston 56 is in its rear position leaving the orifice 58 unobstructed (FIG. 1).

After the flow of molten metal through this orifice 58, hydraulic fluid is injected through the passage 65. The piston 46 moves forwardly and, with it, the piston 49. As long as the mould is not completely filled, the resistance of the metal to the thrust of the injection piston 56 remains small and consequently the pressure created in the chamber 71 remains limited to a value such that the force applied to the valve 78 does not exceed the force of the spring 80. The valve therefore remains closed and the piston 56 moves the same distance as the piston 46 and at the same speed (FIG. 3).

When the mould is full, the working pressure in the jack approaches the maximum value permitted by the source of fluid under pressure and the pressure in the chamber 71 increases.

The force of the calibrated spring 80 is chosen so that the valve 78 moves rearwardly for a pressure in the chamber 71 corresponding to a working pressure of the jack slightly lower than the maximum pressure permitted by the source.

The piston 49 then forces oil from the chamber 71 into the rear part of the jack cylinder, then exhausting, and the increasing hammering force which would be transmitted to the injection piston 56 is used for this fluid transfer. Since the phenomena occurring are extremely transient, the greatest part of this increasing force is dissipated when the piston 49, having forced all the fluid from the chamber 71, arrives in contact with the plate 53 of the cylinder 50 (FIG. 4).

Since the pressure is maintained in the working chamber of the jack 22, the advance of the pistons 46, 49 and 56 proceeds.

Although it is not indispensable to the invention, the pressure step-up device 95 is then brought into action, the working pressure in the jack being thus built up in the ratio high pressure/low pressure of the step-up device when the high pressure chamber 94 of this device feeds the jack 40 through the conduit 93.

At this high pressure of the step-up device, the passage of the normal pressure delivered by the source is, for example, controlled automatically when the piston 49 occupies a given position in its cylinder 50, for example at the end of its travel, an electrical contact 100, fixed with respect to the cylinder 50 and controlling an electrovalve (not shown) being for this purpose actuated by an inclined surface 101, for example on the extension 47, or other similar abutment, rigid with the movable assembly of the said jack.

The thrust of the injection piston 56 thus continues under a working pressure exceeding the maximum pressure of the fluid source (FIG. 5) and this enables a proper compression of the metal in the mould to be obtained.

Once the injection is complete, the piston 46 is moved rearwardly by injection of fluid at 67; the valve 88 is then raised from its seat and hydraulic fluid fills the chamber 71 once again through the conduit 86 and the bore 87, while the piston 49 comes into contact with the rear plate of its cylinder, the injection piston also being rearwardly moved from this moment.

As previously mentioned, the injection piston 56 is mounted at the end of a rod 54 rigid with the body of the cylinder 50.

In one arrangement according to the invention, the rod 54 is fixed in such a way as to enable it to be rapidly and easily dismantled and reassembled.

For this purpose, the rod 54 is provided, at its end adjacent to the cylinder 50, with a flange 105 housed in a recess in a block 106 disposed against the end plate 53 of the cylinder 50. A cap 107 including a frontal plate 108 holds the flange 105 and the block 106 against the plate 53, the said plate 108 having a vertical slot 109 formed therein of width slightly greater than the diameter of the rod 54 and less than the diameter of the flange. This plate 108 rests at its lower edge on a small plate 110 fixed beneath the cylinder 50, and having a groove 111 to accommodate the plate 108. The cap 107 is fixed to the cylinder 50 at its rear edge 112, which is an extension at right angles of the upper edge of the plate 108, by means of a screw 114 passing through this edge and into the body of the cylinder.

Dismantling of the injection piston can be effected very easily. It is only necessary to withdraw the cap 107, to slide the rod 54 slightly forward to disengage the block 106, and then to move the rod rearwardly again. The thickness of the block 106 is selected so as to be greater than the movement necessary to disengage the piston 56 from the chamber 57 and the piston can thus be freed.

Reassembly is performed by reversing the aforesaid movements.

The filling and emptying of the damping chamber 71 can be effected by connecting the chamber to an oil and air accumulator 103 (shown in broken lines in FIG. 1), the piston 49 then being full and the valve 78 and the various conduits controlled thereby being eliminated. This accumulator is adjusted to a pressure corresponding to the pressure which causes the valve 78 to open in the previous case. The oil delivered by the piston 49 during the damping travel empties into the accumulator, which latter restores this oil during the return travel of the jack.

Other variations are possible in forming this damping chamber located between the injection piston and the jack piston.

One of these variants is shown in schematic form in FIG. 7.

The injection piston 56 is fixed directly, by the axial rod 54 to a movable piston 149 located in front of the piston 146 of a control jack 122. The cylinder 140 of this jack, containing the pistons 149 and 146, has openings 165 and 167 at either end thereof connected to a source of hydraulic fluid (not shown). The rod 54 has an axial passage 170 which leads, on the one hand, onto the rear face of the piston 149 through a conduit 150, and on the other hand, onto the lateral face of the rod 54 outside the cylinder 140 through a conduit 151 which a flexible duct 152 connects to an oil and air pressure accumulator 153 (similar to the accumulator 103).

The damping chamber 71 is constituted by the space between the two pistons 146 and 149 and the assembly thus formed functions as previously described, the exhausting of the damping chamber being effected when the pressure in this chamber reaches the value at which the accumulator is set.

Instead of this accumulator, a calibrated valve making a communication between the chamber 71 and the exhausting chamber of the jack can be used.

Here again, a pressure step-up device (not shown) can be brought into operation during or after exhaustion of the chamber 71.

To control this step-up device, a contactor 200 cooperating with an abutment 201 can be used, the contactor being fixed for example on a hollow axial extension 202 of the rear face of the piston 146, this piston itself having an axial bore, while the abutment 201 is fixed to an axial extension 203 of the rear face of the piston 149 which passes through the piston 146 and the extension 202.

As has already been seen, the support 20 bearing the jack 22, with which the injection chamber is rigid, is adjustable in height by displacement of the bed 14. The invention includes using the rods 32 which assist in guiding the support for feeding the jack 22. For this purpose, the rod 32 is a tube and the hinge pivots 33 and 35 are rotary joints at the end of this tube, connected respectively to the fluid source and to the passage 65 by an elbow 104. Another rod 32 of similar design can be used to supply the pressure step-up device.

The rods 32 are arranged so as to be substantially horizontal when the injection assembly is in its low position and to be upwardly inclined from the plate 12 when the assembly is in its high position (FIG. 6). By virtue of this arrangement, the reaction transmitted to the rods during injection tends to apply the support on its bed, and this provides good rigidity of the assembly.

The block 60 can be located in any other intermediate position between the extreme positions of FIGS. 1 and 6 and this results in great flexibility of use of the assembly of the invention.

I claim:

1. An injection assembly for a pressure moulding machine comprising an injection piston moving in an injection chamber located in a mould carrying member of said machine, a double acting hydraulic jack supported with respect to a frame of said machine and having a piston and a cylinder in which said piston is slidably disposed, a source of fluid under pressure and a fluid inlet and fluid outlet to said cylinder, a damping chamber between said injection piston and said jack piston, a piston defining one end of said damping chamber and connected to said jack piston, movement of said jack piston being transmitted to said injection piston through said damping chamber and piston therein, means permitting exhaustion of fluid from said damping chamber when the pressure in said chamber reaches a predetermined value, whereby pressure overloads imposed on said injection piston during an injection operation are dissipated in operating said fluid exhaustion means to permit fluid to flow from said damping chamber, a pressure step-up device forming an assembly with said jack and arranged to supply fluid to actuate said jack when the damping chamber is empty, a bed mounted on a slide of said machine frame and having an inclined surface on which said jack and pressure step-up device assembly is mounted, a rotatable screw device and a threaded member on said bed engaging therewith so that rotation of said screw causes translational movement of said bed on said slide, and rods forming a deformable parallelogram and connecting respectively said bed and said jack and pressure step-up device assembly to said mould carrying member in such a way that translation of said bed on said slide raises or lowers the injection chamber in an opening in said mould carrying member.

2. An injection assembly for a pressure moulding machine comprising an injection piston moving in an injection chamber located in a mould carrying member of said machine, a double acting hydraulic jack supported with respect to a frame of said machine and having a piston and a cylinder in which said piston is slidably disposed, a source of fluid under pressure and a fluid inlet and fluid outlet to said cylinder, a damping chamber between said injection piston and said jack piston, a piston defining one end of said damping chamber and connected to said jack piston, movement of said jack piston being transmitted to said injection piston through said damping chamber and piston therein, means permitting exhaustion of fluid from said damping chamber when the pressure in said chamber reaches a predetermined value, whereby pressure overloads imposed on said injection piston during an injection operation are dissipated in operating said fluid exhaustion means to permit fluid to flow from said damping chamber, and an axial extension of said damping chamber piston rigidly connected to said jack piston, a conduit formed in said extension connecting an exhaust orifice controlled by said fluid exhaustion control means to the jack cylinder at the end of the jack piston remote from said fluid inlet, said exhaust orifice being formed in said damping chamber piston.

3. An assembly according to claim 1 wherein at least one of said rods is hollow, and combined with at least one hollow pivot forms a pressure fluid supply conduit to said jack.